UNITED STATES PATENT OFFICE.

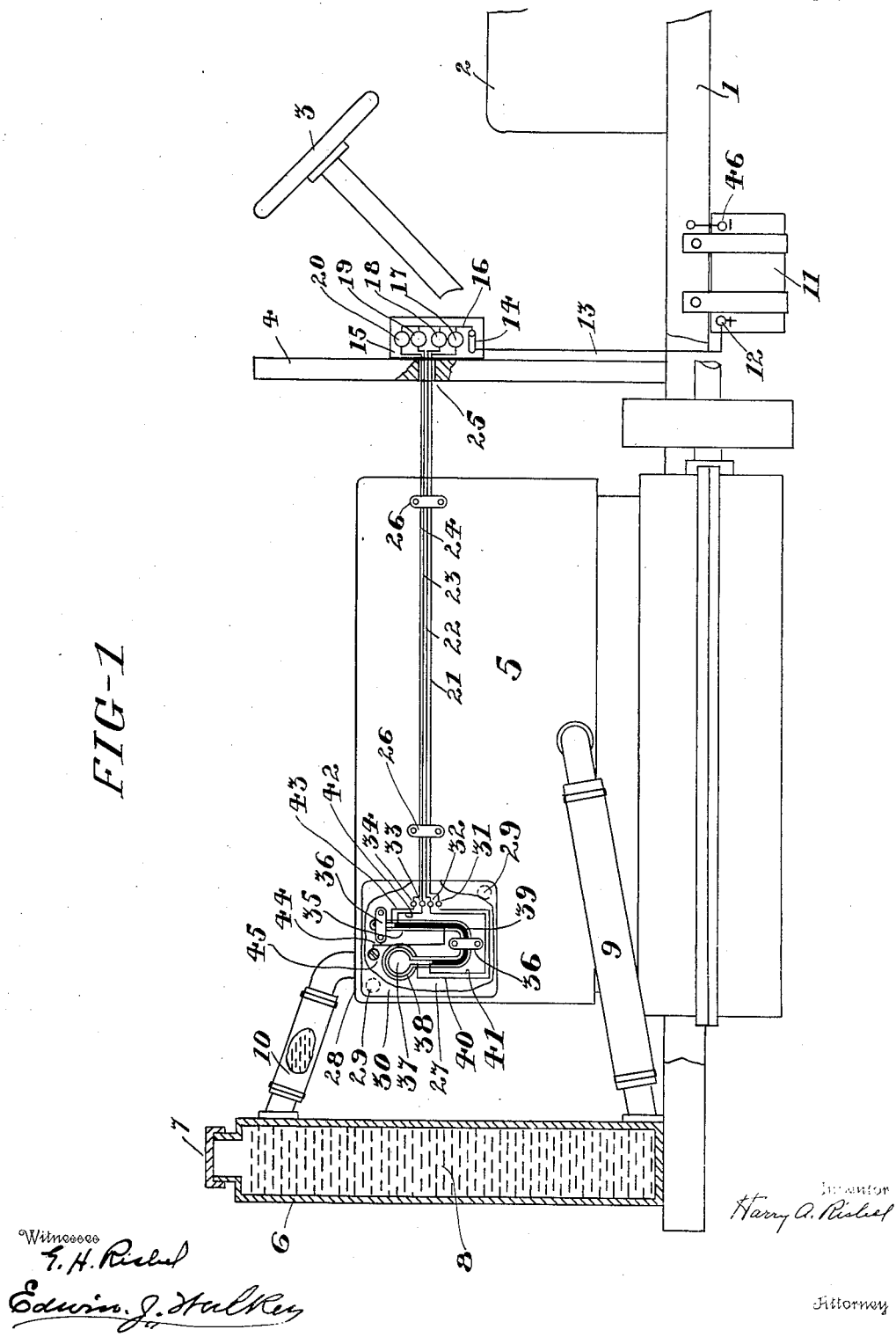

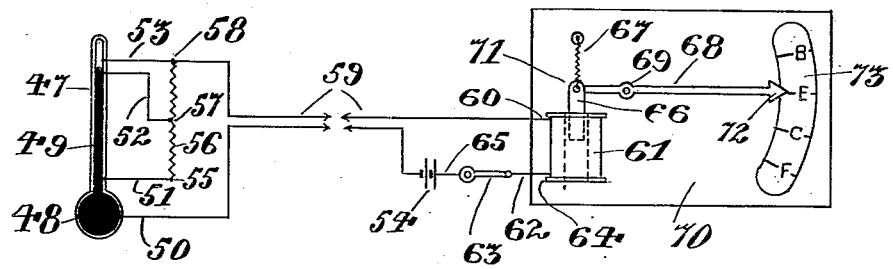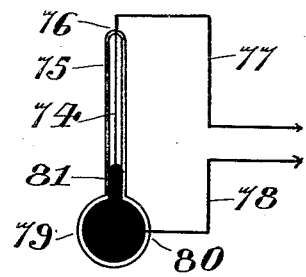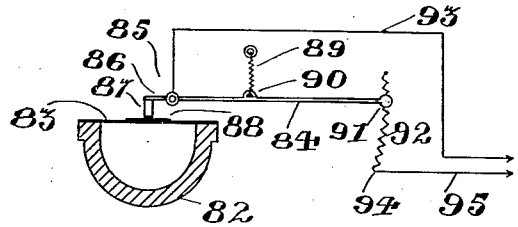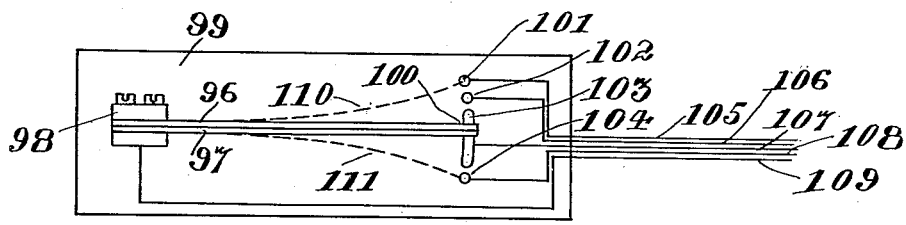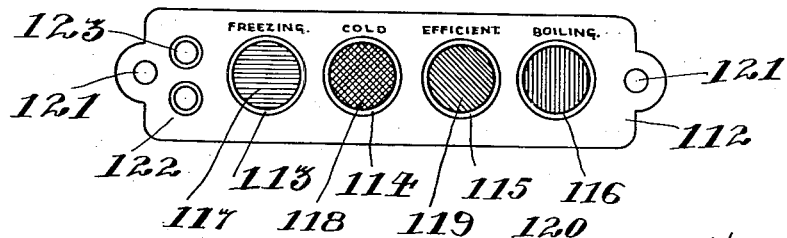

HARRY A. RISHEL, OF PHILADELPHIA, PENNSYLVANIA.

TEMPERATURE-INDICATOR FOR AUTOMOBILES.

1,393,968.  Specification of Letters Patent.  Patented Oct. 18, 1921.

Application filed February 10, 1917. Serial No. 147,910.

*To all whom it may concern:*

Be it known that I, HARRY A. RISHEL, a citizen of the United States, residing at Philadelphia, in the county of Philadelphia, State of Pennsylvania, have invented certain new and useful Improvements in Temperature-Indicators for Automobiles, of which the following is a specification.

My invention relates particularly to the engine cooling system, and by its use, it is possible to know when normal and abnormal conditions are existing therein. At this stage of the automobile art, cooling systems of internal combustion engines, are being equipped with appliances useful in regulating the amount of air passing over the cooling surfaces, particularly where water is used as the medium for cooling the cylinders. As these devices are not automatic in nature, but dependent entirely upon the judgment of the operator for their best performance, it is desirable to have a device which will give more definite information when such appliances are in proper adjustment, that is when the correct amount of air is passing, or when too much air is passing over the cooling surfaces and to also warn him when the cooling water is in danger of freezing.

The device is particularly valuable in bringing to the operator's attention in a forceful way the fact that the cooling water is approaching its boiling point, and in time to correct the cause thereof before the boiling has actually occurred, thereby saving the annoyance of replacing the water which has boiled away, and to also avoid having the top of the radiator and hood disfigured with rust forced out by the boiling up of the water.

My invention broadly comprehends an arrangement of means whereby a temperature responsive element, in connection with an electrical circuit, controlled by the said temperature responsive element, causes the change in temperature in the engine cooling system to be noted at the dash by the glowing or non-glowing of one or more of a bank of incandescent lamps or by the movement of the pointer of an electrical indicating instrument which employs the medium of an electrical field for its operation in connection with an electrical resistance.

In the accompanying drawings, Figure 1 is a fragmentary side elevational view of an automobile showing the radiator in section and with an instrument, constructed in accordance with my invention which indicates to the operator of the machine, when the temperature of the engine water is correct for best running conditions. The heat responsive element of the device is shown somewhat larger relative to the size of the engine than is actually used in practice.

Fig. 2 is a diagrammatic view of a modification of the device illustrated in Fig. 1, in which an electrical indicating instrument replaces the bank of incandescent lamps used in the first arrangement and which is actuated by a change of electrical resistance inserted in the electrical circuit, the amount of resistance in said circuit depending upon the height of the mercury column.

Fig. 3 is a view of a heat responsive element somewhat different in construction from that shown in Fig. 2, in which the resistance of the circuit is cut out gradually instead of by steps.

Fig. 4 is a diagrammatic view of a heat responsive element the operation of which is dependent upon the movement of a diaphragm, actuated by a change in pressure of the gas within the container sealed by the said diaphragm, the said container being shown in section for convenience of illustration.

Fig. 5 is a diagrammatic view of a heat responsive element dependent for its operations upon the well-known principle of unequal rate of expansion of two different metals.

Fig. 6 is a front elevational view of a dashboard instrument showing the arrangement and construction of the color signals used in connection with the device as shown in Fig. 1 or the heat responsive element illustrated in Fig. 5.

In Fig. 1, the automobile, comprises the longitudinal frame bars 1, the driver's seat 2, the steering wheel 3, dashboard 4, engine 5, the radiator 6, having the water filler 7. The radiator 6 is filled with the water 8, which is, in this case, used as the medium for cooling the engine cylinders. The water 8, is carried to the water jacket surrounding the said engine cylinders by the pipe 9 and returned to the said radiator by the pipe 10. The cooling system as herein illustrated is of the thermo-siphon type. The electric storage battery 11 in common use on automobiles is carried by the frame bar 1.

From the positive terminal 12 of the storage battery 11, the electric cable 13, is run vertically upward along the dashboard 4 to one terminal of the switch 14, the said switch being screwed to the lamp blocks 15, attached to the dashboard 4. From the other terminal of the said switch runs the lead 16, with branches to the incandescent lamps 17, 18, 19 and 20, the said lamps also being mounted on the block 15. From the low tension terminals of the said lamps run the leads 21, 22, 23, and 24, the lead 21 being connected to lamp 17, lead 22 to lamp 18, lead 23 to lamp 19, and lead 24 to lamp 20. These said leads are passed through an opening 25, in the dashboard 4, and run from the said lamp block horizontally along the side of the engine 5 to the temperature responsive element essential to the appliance. The said leads 21, 22, 23 and 24, are held in place by the cleats 26, so designed as to prevent the said leads from coming into direct contact with the engine water jacket walls.

The temperature responsive element comprises the block 27, made of a composition board, slate or any desirable material, and carried by the water jacket wall 28, it being fastened thereto by the stud bolts 29. The casing 30 which is thermally insulated, shown herein partially cut away for convenience of illustration, snaps down over said blocks 27, and prevents the mechanism from being influenced by external air currents, as well as protecting the contents from accidental damage.

The leads 21, 22, 23, and 24 are attached to the terminals 31, 32, 33 and 34 respectively, mounted on the block 27. On the said block is also mounted the glass U-shaped tube 35 and attached thereto by the cleats 36. The shorter leg of said tube 35 is capped with the bulb 37, the said bulb containing nitrogen gas or a substitute therefor which does not become a conductor of electricity at ordinary low voltages. The said bulb 37 is countersunk into the hole 38, which passes through the said block 27. This allows it to come into close proximity to the water jacket wall of the said engine 5 and causes the gas therein to quickly respond to a change of temperature in the said cooling water jacket 28, which being ordinarily made of cast iron, is a good conductor of heat and is approximately the same temperature as the engine cooling water. The end of the longer leg of said tube is sealed. The space above the mercury 39, contained within the longer leg of said U-tube being approximately in vacuum. Inserted through and sealed in the U-tube 35 are the wires 40, 41, 42, 43 and 44—the portion of the said wires which pass into the said U-tube being made of platinum or a substitute therefor having the same coefficient of expansion. The wire 40 is run to the terminal 31, wire 41 to the terminal 32, the wire 42 to the terminal 33 and the wire 43 to the terminal 34. The wire 44 is carried to the terminal 45 through which it is grounded to the engine 5. The negative terminal 46 of the storage battery 12, is grounded on the frame bar 1, thereby completing the electrical circuit through the engine 5 and frame bar 1.

It is obvious that as long as the switch 14 is shut the closing and opening of the electrical circuits through the said incandescent lamps is dependent upon the position of the mercury column 39. The position of the said mercury column, in turn, is dependent upon the pressure exerted upon it by the gas contained in the bulb 37, the pressure of said gas being dependent upon its temperature and therefore upon the temperature of the engine cooling water.

As illustrated in Fig. 1 the mercury column 39 stands at such a height as to close the circuit between the conductor 42 and the conductor 44, in which circuit is the lamp 19. The circuit being thus closed the filament of the said lamp becomes incandescent, due to passage of the electric current therethrough. The temperature of the engine cooling water in the upper part of the water jacket under these conditions is approximately 180 degrees Fahrenheit. If for any reason the temperature of the engine cooling water should rise to 200 degrees Fahrenheit, the gas in the bulb 37, increasing in temperature therefrom and therefore in pressure, will force the mercury column 39 up the longer leg of the U-tube and close the circuit in which the lamp 20 is inserted as well, and cause the same to glow, thereby warning the driver that his engine cooling water is rising to a temperature close to the boiling point and he should therefore investigate the cause thereof.

On the other hand should, for any reason, such as excessive radiation, the temperature of the engine cooling water drop, the mercury column in the longer leg of the U-tube will recede, and rise a corresponding amount in the shorter leg, opening the circuits of lamps 19 and 20, and closing the electric circuit through the lamp 18, causing the same to glow and call the operator's attention to the fact that his motor is being excessively cooled. Furthermore should the car be parked in a freezing temperature, the mercury in the shorter leg will continue to rise as the motor continues to cool off and the gas in the bulb 37 contracts and when its temperature has dropped to 40 degrees the mercury column will have risen to a point such as to close the circuit in which the lamp 17 is inserted, causing it to glow and thereby call to the operator's attention the fact that the water is in danger of freezing.

In order to make the changes in temperature more noticeable the bulbs of the said electric lamps may be differently colored, as for example: blue indicating danger of freezing; orange, inefficient motor; green, motor running at best temperature and red indicating danger of boiling.

It is also desirable to have the distance between the platinum leads 41 and 42 slightly less than the length of the mercury column 39 so that lamp 19 will light up before lamp 18 goes out or vice versa, as in this manner the operator is better informed as to the condition of the instrument.

Viewed from the operator's position the action is as follows: If the engine cooling water is in danger of freezing, the blue and orange colored lamps both glow. If the engine is started, the temperature of the cooling water rises and the blue lamp indicating danger of freezing goes out, leaving only the orange colored lamp burning. This will continue to be the only lamp burning until a temperature of 180 degrees Fahrenheit is reached when the green lamp will also light. As soon as the temperature rises slightly above 180 degrees, the orange light will go out, leaving the green light only burning, indicating that the engine is now running at its best temperature. If for any reason the temperature of the engine water should continue to rise until it reaches 200 degrees Fahrenheit, the red lamp will flash, attracting the operator's attention instantly to the fact that the cooling water is in danger of boiling and it is time to investigate.

When the automobile is not in use the switch 14 may be opened thereby rendering the appliance inoperative.

The modification illustrated in Fig. 2 comprises the glass tube 47, sealed at its upper end, carrying the bulb 48 at its lower end and containing the mercury 49. It is placed close to the water jacket of the engine in the same manner as described in connection with the temperature responsive element illustrated in Fig. 1. Inserted into the said tube are the electric wires 50, 51, 52 and 53. The end of the said wires, entering the glass tube, being made of platinum or a substitute therefor having the same coefficient of expansion, to prevent air leakage as the glass tube expands and contracts. The wire 50 connects the mercury in the bulb 48 to the battery 54, the wire 51 connects the mercury column to the terminal 55 of the electrical resistance 56; the wire 52 connects the mercury column to the half way point 57 of the said electrical resistance 56, and the wire 53 connects the mercury column to the terminal 58 of the said resistance 56. The wire 59 connects the terminal 58 to the terminal 60 of the solenoid 61. The wire 62 connects the switch 63, to the terminal 64 of the said solenoid while the wire 65 joins the switch 63 to the battery 54.

The height of the mercury column 49 as shown corresponds to a temperature of 180 degrees Fahrenheit in the engine cooling water. In this position it is obvious that the portion of the electrical resistance between the points 55 and 57 has been shunted by the mercury column 49. The current passing through the solenoid 61 under these circumstance is large enough to create a magnetic field sufficiently strong to draw the iron core 66 down into the said solenoid to the position shown, against the action of the spring 67. The pointer 68 is pivoted at 69 to the base 70, revolving around this point as a center. The shorter leg of the said pointer is pinned to the iron core 66 at 71 and moves down with the iron core as it is drawn into the solenoid 64. This causes the arrow head 72 to move across the indicating scale 73. In the illustration the said pointer stands at E, indicating an efficient engine. Should for any reason the temperature of the engine cooling water increase to 200 degrees Fahrenheit the mercury column 49 will rise, and shunt the remaining section of the resistance 56 between the points 57 and 58, causing a larger current to pass through the said solenoid and with the increase in the field resulting therefrom, the iron core 66 will be drawn farther down, causing the arrow head 72 to move to B, which indicates danger of boiling.

If for any reason the temperature of the engine water drops below 180 degrees Fahrenheit the entire resistance 56 is thrown into circuit when the mercury column 49 recedes below the point of insertion of the wire 52. This will so decrease the current flowing that the arrow head will move to C, indicating a cold motor.

If the engine cooling water is allowed to approach freezing, the electrical circuit of the indicating system is broken entirely as soon as the temperature of the water drops below 40°, as at this point the mercury column 49 will recede to a level which is below the point of insertion of the wire 51 and so opening the circuit at this point. This will cause the arrow head 72 to move to F, indicating danger of freezing.

Fig. 3 illustrates a modification of the electrical resistance as described and illustrated in connection with Fig. 2. In this arrangement, a resistance wire 74 is inserted into the glass tube 75 at the top thereof and runs its full length. At the terminal 76 where the said resistance wire 74 passes through the glass tube 75, the wire is of platinum to prevent air leakage. From said terminal 76 runs the wire 77 to an electrical indicating mechanism herein not shown but similar to that illustrated in Fig. 2, while the wire 78 entering the bulb 79, carried at the lower end of said glass tube, at the point 80, runs to a battery herein not shown. It is obvious that as the mercury 81 rises in the said tube 75, as the temperature of the engine cooling water increases, the resistance in the electrical circuit is gradually decreased as a greater amount of the said electrical resistance wire 74 is submerged in the mercury 81.

The modification of the temperature responsive element illustrated in Fig. 4 comprises the semi-cylindrical vessel 82 the top of which is sealed by the diaphragm 83, made in this case of rubber. The rod 84 is pivoted at the point 85. Fastened at the end 86 of the said rod is the finger 87 which rests on the plate 88 attached to the diaphragm 83. The spring 89, fastened to the rod 84 at the point 90, holds the finger 87 firmly against the plate 88. The contact finger 91, fastened to the outer end of the said rod, moves over the electrical resistance 92. From the pivot point 85 runs the electrical wire 93, being carried therefrom to an electrical indicating instrument herein not shown but similar to the instrument illustrated in Fig. 2. From the terminal 94 of the said electrical resistance wire 92 runs the wire 95, being carried therefrom to a battery herein not shown.

When the temperature of the engine cooling water rises, the gas contained in the semi-cylindrical vessel 82, the said vessel being placed in close proximity to the water jacket of the engine, increases in pressure forcing the diaphragm 83 upward which actuates the rod 84 causing the contact finger 91 to move downward and thereby decreasing the electrical resistance in the electrical circuit, and so increasing the flow of current through an electrical indicating instrument similar to the one illustrated in Fig. 2.

The heat responsive element illustrated in Fig. 5, operative by the change in shape, under heat variations, of a metallic part, and composed of two metals having unequal rates of expansion, comprises in this particular arrangement the two thin strips of metal 96 and 97, the piece 96 being made of steel and the piece 97 made of brass, soldered together throughout their entire length. At the one end are the blocks 98 fastening the said strips to the base 99 while at the end 100 the said strips slide over the electrical contacts 101, 102, 103, and 104 from which run the wires 105, 106, 107, and 108 respectively, they being carried therefrom to electric incandescent lamps, herein not shown, but arranged similarly to those illustrated in Fig. 1. The wire 109 is a return wire running from the block 98 to the negative side of a storage battery herein not shown. This temperature responsive element is in close proximity to the engine water jacket that it may be effected by any change in the temperature of the engine cooling water.

If the temperature of the engine cooling water rises the more rapid rate of expansion of the brass strip 97, causes the compound bar to bend approaching the dotted curve 110 and in so doing the end 100 moves over contact 103 to contact 102 and so causing the electrical circuit to be open through wire 107 and closed through wire 106. If the engine cools the reverse takes place, the said compound bar straightens and then bends to approach the curve 111 and in so doing moves to the contact 104 and closes the circuit through the wire 108.

In order to avoid the necessity of using colored incandescent lamps to denote changes in the engine water temperature, and still have the advantage of the different colored lights the lamps may be placed in individual cells and the whole covered by the face plate illustrated in Fig. 6 and which comprises the metallic plate 112, having the openings 113, 114, 115, 116, in which openings are inserted the colored glasses 117, 118, 119 and 120, in back of each being a clear glass incandescent lamp arranged as those described in connection with Fig. 1, the piece of glass 117 being blue and indicating freezing, the piece 118 being orange and indicating a cold motor, the piece 119 being green, indicative of an efficient motor and the glass 120 being red and indicating danger of boiling.

The holes 121 are used to pass bolts through to fasten said face plate to the dashboard of the automobile. The switch push buttons 122 and 123 passing through the said plate are used to open and close the electrical circuit and so render the instrument operative or otherwise.

I do not desire to limit my invention to the precise details of construction and arrangement herein set forth as it is obvious that the device may be used in connection with an internal combustion engine other than used to propel an automobile. It is also evident that various modifications may be made therein without departing from the essential features of the invention as defined in the appended claim.

Having thus described my invention, I claim:—

In a device of the kind described which includes a thermal element adapted for application to a water jacket wall and an indicator adapted for application to a dash, transmitting means comprising the combination of a thermally insulating casing applied to the water jacket wall and inclosing the thermal element and electrical connections extending through the wall of the casing and from the element to the indicator and including a source of current, substantially as described.

In testimony whereof I have hereunto set my hand in the presence of two subscribing witnesses.

HARRY A. RISHEL.

Witnesses:
 E. H. RISHEL,
 EDWIN J. WALKER.